(12) United States Patent
Chapron

(10) Patent No.: US 11,028,548 B2
(45) Date of Patent: Jun. 8, 2021

(54) DEVICE FOR PROTECTING THE SHORELINE AGAINST THE RISKS OF SUBMERGENCE FROM THE SEA, COMPRISING A CURVED FRONT FACE AND PROTECTING DIKE COMPRISING A PLURALITY OF ALIGNED PROTECTION DEVICES

(71) Applicant: Romain Chapron, Anglet (FR)

(72) Inventor: Romain Chapron, Anglet (FR)

( * ) Notice: Subject to any disclaimer, the term of this patent is extended or adjusted under 35 U.S.C. 154(b) by 0 days.

(21) Appl. No.: 16/614,936

(22) PCT Filed: May 18, 2018

(86) PCT No.: PCT/EP2018/063162
§ 371 (c)(1),
(2) Date: Nov. 19, 2019

(87) PCT Pub. No.: WO2018/211094
PCT Pub. Date: Nov. 22, 2018

(65) Prior Publication Data
US 2020/0208366 A1 Jul. 2, 2020

(30) Foreign Application Priority Data

May 19, 2017 (FR) ...................... 1754443

(51) Int. Cl.
*E02B 3/10* (2006.01)
*E02B 3/06* (2006.01)

(52) U.S. Cl.
CPC ............. *E02B 3/106* (2013.01); *E02B 3/06* (2013.01)

(58) Field of Classification Search
CPC . E02B 3/108; E02B 3/106; E02B 3/10; E02B 3/06
(Continued)

(56) References Cited

U.S. PATENT DOCUMENTS

| 4,921,373 A * | 5/1990 | Coffey ................... E02B 3/108 256/13 |
| 5,655,851 A * | 8/1997 | Chor ........................ E02B 3/06 405/15 |

(Continued)

FOREIGN PATENT DOCUMENTS

| DE | 10211705 | * 10/2003 |
| FR | 1 604 449 | 11/1971 |

(Continued)

OTHER PUBLICATIONS

International Search Report, PCT/EP2018/063162, dated Aug. 6, 2018.

*Primary Examiner* — Sean D Andrish
(74) *Attorney, Agent, or Firm* — Nixon & Vanderhye

(57) ABSTRACT

A shoreline protection dike includes a plurality of juxtaposed protection devices each including a front face which is curved so as to deflect the water from each wave upwards and back in the direction of ebbing. The front face includes a concave curved shape formed by lines parallel to one another and extending between lower and upper edges of the front face, each line resting on a curved line which extends in a plane perpendicular to the lower and upper edges, the curved line including a first sector which forms a first arc and at least a second sector which forms a second arc.

13 Claims, 6 Drawing Sheets

(58) Field of Classification Search
USPC .......................................................... 405/115
See application file for complete search history.

(56) References Cited

U.S. PATENT DOCUMENTS

2012/0308305 A1    12/2012  Kaye
2015/0240435 A1     8/2015  Schneider

FOREIGN PATENT DOCUMENTS

WO    WO 2009/045030     4/2009
WO    WO 2013/157922    10/2013

* cited by examiner

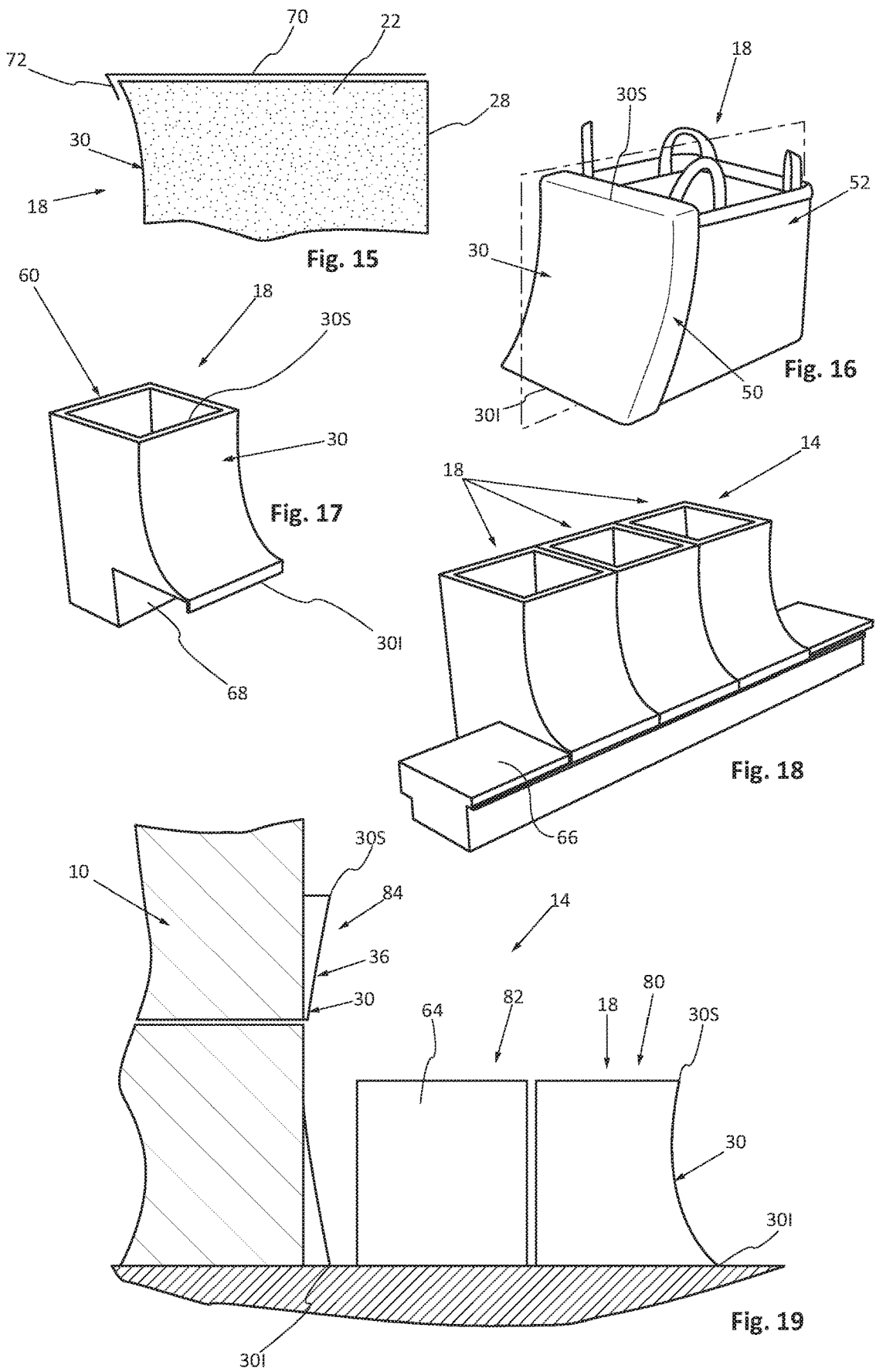

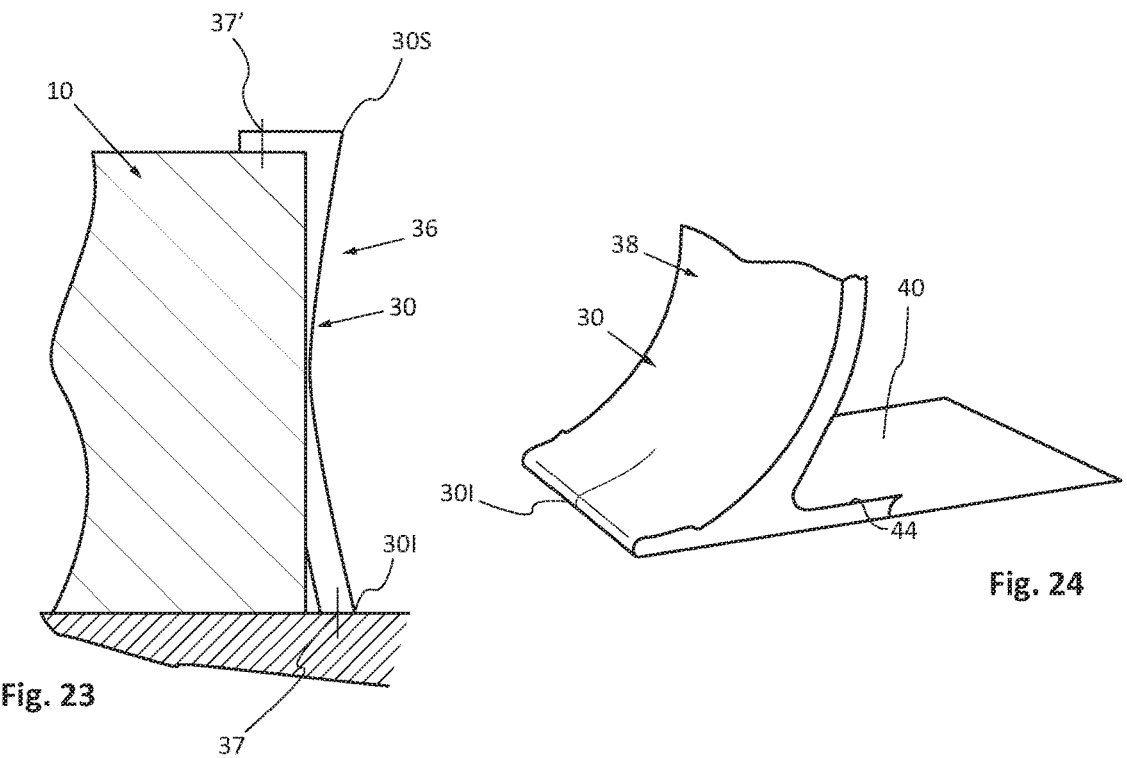
Fig. 23
Fig. 24
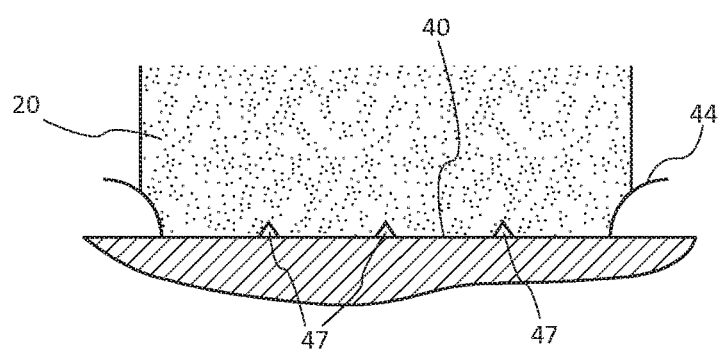
Fig. 25
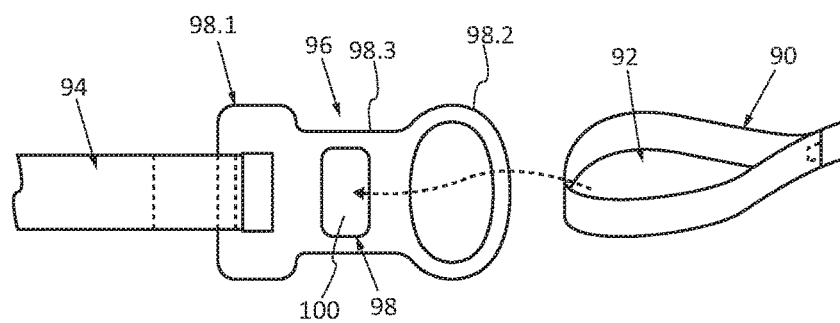
Fig. 26A
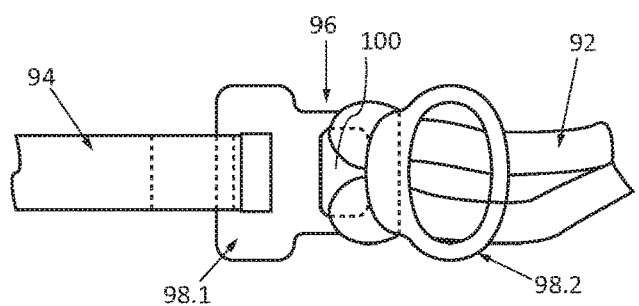
Fig. 26B

DEVICE FOR PROTECTING THE SHORELINE AGAINST THE RISKS OF SUBMERGENCE FROM THE SEA, COMPRISING A CURVED FRONT FACE AND PROTECTING DIKE COMPRISING A PLURALITY OF ALIGNED PROTECTION DEVICES

BACKGROUND OF THE INVENTION

Field of the Invention

This invention relates to a device for protecting the shoreline against the risks of submergence from the sea comprising a curved front face as well as to a protective dike comprising a plurality of aligned protection devices.

The phenomenon of submergence from the sea takes place when several factors combine, namely a large tidal coefficient, a rise in the level of the water (called storm surge) because of a low value of the atmospheric pressure and the surge of waves on the shoreline because of a strong swell and/or because of a strong wind in the direction of the shoreline.

Thus, the phenomenon of submergence from the sea occurs over a short period, around high tide.

Other factors can aggravate this phenomenon, such as for example the configuration of the sea floors, the changing coastline, the rise of the level of the ocean, the reduced safe distance for old structures, etc.

Thus, the phenomenon of submergence from the sea can have an impact on sectors of the shoreline that are different from one another (depending on the configuration of the sea floors). Furthermore, the impact of the phenomenon of submergence from the sea on a given sector of the shoreline can change over time because of the changing configuration of the sea floors. Thus, a strongly impacted sector can no longer be strongly impacted some time later or a sector that was not strongly impacted can become strongly impacted.

Description of the Related Art

A first solution to protect the shoreline against such a phenomenon consists in erecting a permanent dike. However, this solution is not appropriate because it has a strong impact on the environment, particularly from an esthetic point of view, and a very high cost. It is even less appropriate since the phenomenon of submergence from the sea is very short-lived, for example a few hours (5 to 6 hours a day), a few days in a year and since its impact can change over time.

A second solution consists in filling with sand large capacity bags, also called "big-bags," and in aligning them against one another in front of the sector of the shoreline to be protected.

This temporary solution is put in place between two tides, in front of the sector to be protected.

This second solution is appealing because it is much less costly than the previous one and does not harm the esthetics of the shoreline because it can be removed. According to another aspect, it can be positioned appropriately as a function of the zone to be protected thanks to its modifiable nature.

Despite these advantages, this second solution is not entirely satisfactory because it does not guarantee optimal protection. Thus, the various bags can, because of the impact of the large amounts of water, move and slightly rise up, come apart and collapse. In case of movement or destruction of certain bags, the line of protection formed by the bags is no longer continuous and gaps can appear, leaving the zones facing these gaps without protection while increasing the phenomenon of storm surge and flooding.

The document US 2012308305 describes a device for fighting against the erosion of a coastline. This device which can be installed at the foot of a sand dune has in a lower part a curved wall which tends to push up the wave and to protect the foot of the sand dune.

Like the preceding document, the document WO 2009045030 describes a dike which has a curved wall which tends only to push up the wave. The devices described in these two documents do not have an optimal shape to absorb the energy of the waves.

The document FR 1604449 describes a dike with a curved wall in the upper part which tends to turn back the wave in the direction of the outflow. This dike has a vertical foot.

This shape is not optimal for absorbing the energy of the waves.

This invention aims to eliminate the drawbacks of the prior art.

BRIEF SUMMARY OF THE INVENTION

For this purpose, the invention has as its object a protective device designed to be aligned with other protective devices so as to form a protective dike, characterized in that the protective device comprises a curved front face, configured to divert the water of a wave upward then drive it back in the direction of the outflow of the wave.

The curved shape of the front face of the protective device makes it possible, with an equal mass or volume of ballast, to increase the energy of the wave that is absorbed and to limit the impact of the waves.

According to another advantage, the protective devices make it possible to form a modifiable, removable and non-permanent dike.

BRIEF DESCRIPTION OF THE DRAWINGS

Other characteristics and advantages will come out from the description of the invention which follows, a description given solely by way of example, with regard to the accompanying drawings in which:

FIG. 15 is a cutaway view which illustrates the upper part of a protective device equipped with a cover, FIG. 16 is a perspective view of a protective device which illustrates a third embodiment, FIG. 17 is a perspective view of a protective device which illustrates a fourth embodiment, FIG. 18 is a perspective view of a protective dike made of several protective devices seen in FIG. 17, FIG. 19 is a cutaway view of a protective dike which illustrates the combination of several protective devices, FIG. 23 is a cutaway view of a protective device attached to a structure which illustrates an embodiment of the invention, FIG. 24 is perspective view of a protective device which illustrates a variant of the embodiment seen in FIG. 9, FIG. 25 is a cutaway view of a protective device which illustrates another embodiment of the invention, and FIGS. 26A and 26B are front views of a system for connecting two protective devices which illustrate an embodiment of the invention in the unattached state and in the attached state.

DETAILED DESCRIPTION OF THE PREFERRED EMBODIMENTS

Figure 1:
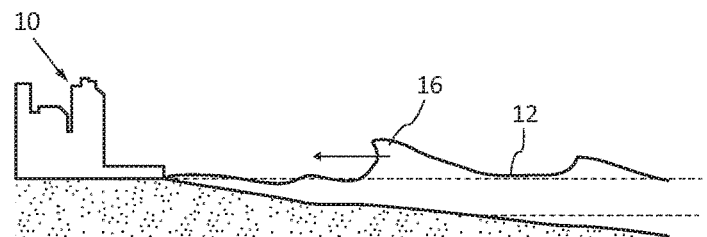
FIG. 1 is a diagram illustrating a zone of the shoreline without protection at a first alert level.
Figure 2:
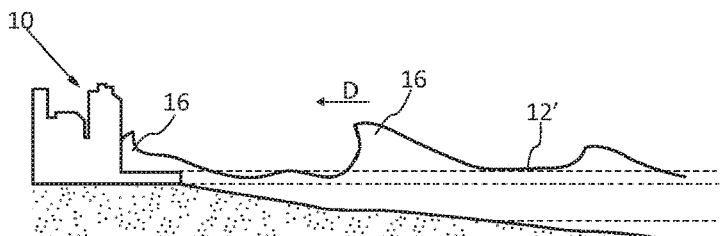
FIG. 2 is a diagram illustrating the same zone of the shoreline without protection at a second alert level, higher than the first.
Figure 3:
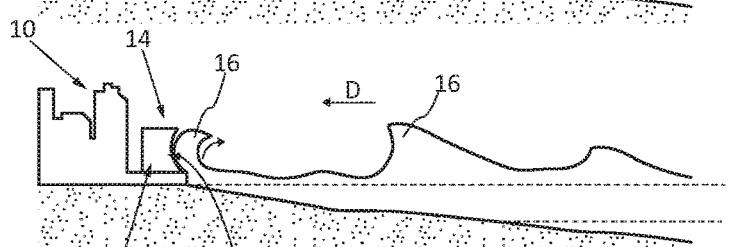
FIG. 3 is a diagram illustrating the same zone of the shoreline with a protection according to the invention, at the second level of protection.
Figures 4, 5:
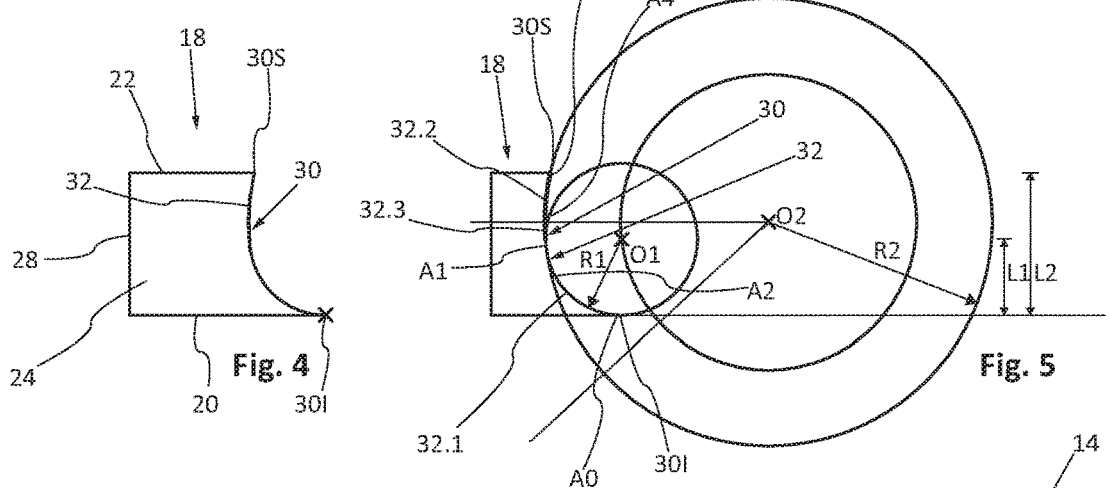
FIG. 4 is an end view of a protective device which illustrates the invention.
FIG. 5 is a diagram that illustrates various curve portions of the front face of a protective device.

In FIGS. 1 to 3, a zone of the shoreline has been represented which comprises at least one zone to be protected, such as for example a structure 10. The level of the water can change depending on the duration of the tide and as a function of the coefficient of the tide. In FIG. 1, a water level 12 has been represented that corresponds to the high tide for a large tide coefficient and which corresponds to a first alert level. For this level of alert, the structure 10 can endure without protection.

As illustrated in FIG. 2, for the same tide coefficient, the water level 12' is higher at the time of high tide because of a storm surge (generated by low atmospheric pressures during a low) and/or because of a swell and/or because of a heavy wind. Without protection, the structure 10 is impacted by the waves in a very significant manner, which can cause serious damage. To protect the structure 10 or any other zone, a protective device 14 is erected in front, making it possible to absorb a portion of the energy of the waves 16, as illustrated in FIG. 3.

The protective dike 14 extends along a line that can be straight or curved.

For the rest of the description, the mean line formed by the protective dike corresponds to the longitudinal direction. The transverse direction is perpendicular to the longitudinal direction.

The waves travel in a surge direction D which can be perpendicular to the longitudinal direction.

According to one configuration, the protective dike 14 is straight and extends in a longitudinal direction that is perpendicular to the surge direction. Of course, the invention is not limited to this configuration.

The protective dike 14 comprises a plurality of protective devices 18 that are juxtaposed so as to form a continuous line. To give a rough estimate, each protective device has a width (dimension taken in the longitudinal direction) of about one meter.

Each protective device 18 comprises a lower face 20 designed to rest on the ground, an upper face 22 away from the ground, two side faces 24, 26, parallel to one another and which extend between the lower and upper faces, a back face 28 which is approximately perpendicular to the side faces 24, 26 and which extends between the lower and upper faces and a front face 30 oriented in the direction of the waves.

To simplify the description, the side and back faces 24, 26 and 28 are approximately flat. In actuality, they are generally curved.

The front face 30 comprises a lower edge 30I connected to the lower face 20 and an upper edge 30S connected to the upper face 22. According to one configuration, the lower and upper edges 30I and 30S are parallel.

According to a characteristic of the invention, the front face 30 comprises a concave curved shape, said front face 30 being formed by straight lines, parallel to one another and to the lower and upper edges 30I, 30S, which are resting on a curved line 32 which extends in a plane perpendicular to the lower and upper edges 30I, 30S.

The front face comprises in the lower part a curved portion designed to absorb a part of the energy of the swell and/or of the waves by diverting the water upward and in the upper part a curved portion designed to absorb a part of the energy of the swell and/or of the waves by driving the water back in the direction of the outflow of the wave.

According to one characteristic, the curved line 32 comprises a first sector 32.1 which forms a first arc of a circle. According to an embodiment, the first sector 32.1 extends from a point A0, located on the lower edge 30I, to a point A1 such that the ratio (2×L1/3×L2) is equal to a constant, L2 being the total height of the front face 30, L1 corresponding to the distance between the point A0 and the center O1 of the first arc. According to one embodiment, the center O1 of the first arc is located vertically from the point A0 and at the same height as the point A1 (the line A1O1 being horizontal).

According to another feature of the first sector 32.1, it comprises a point A2 located at about a third of the height L2 of the front face 30 such that the horizontal direction and the line A0A2 form an angle of about 35°.

This first sector 32.1 is designed to absorb a part of the energy of the swell and divert the movement of the swell upward. The shape of the first sector 32.1 is designed to make possible an accumulation of sand in the lower part, particularly between the chord A0A2 and the first arc, which contributes to preventing the lower edge 30I from rising up. This latter point makes it possible to prevent sand from accumulating under the protective device.

The curved line 32 comprises at least a second sector 32.2 which extends up to a point A3 located on the upper edge 30S.

According to a feature of the curved line 32, the line A1A3 forms, with the vertical, an angle greater than 1°, and preferably about 5°, the point A3 being offset toward the point A0 relative to the vertical passing through the point A1.

This second sector 32.2 forms a deflection zone which makes it possible to send the energy of the swell back out to sea, as represented by the arrow 34 in FIG. 3.

According to one embodiment, the second sector 32.2 describes a second arc with a center O2 and a radius R2, O2 being the center of the circle making it possible to have an angle of 5° on the second sector 32.2.

According to one configuration, the curved line 32 comprises an intermediate sector 32.3 which ensures the continuity between the first and second sectors 32.1 and 32.2 and which extends from the point A1 to a point A4. At the junction point A1, the first sector 32.1 and the intermediate sector 32.3 have approximately the same tangent, to ensure a continuity between the two sectors 32.1 and 32.3. Similarly, at the junction point A4, the intermediate sector 32.3 and the second sector 32.2 have approximately the same tangent, to ensure a continuity between the two sectors 32.3 and 32.2.

The intermediate sector 32.3 is designed to absorb a part of the energy of the swell and to accelerate the upward movement.

According to the invention, the front face 30 is curved to divert the water of a wave upward then drive it back in the direction of the outflow of the wave in order to absorb a part of the energy of a first wave and divert it out to sea, which makes it possible to slow down and reduce the impact of the following wave. A part of the mass of water of the wave is ejected upward with a turn-back effect. According to an important point, the withdrawal of the part of the mass of water not driven back out to sea is accelerated. This acceleration of the withdrawal limits the possibility of storm surge and creates an offset return making it possible to reduce the force, the speed and the impact of the following wave on the protection.

Regardless of the variant, the protective device comprises at least one curved front face 30 that is associated with a ballast. Thus, having an equal mass or volume relative to the single large capacity bag of the prior art, the protective devices according to the invention are designed to absorb a greater amount of energy because of the curved front face 30.

Figure 9:
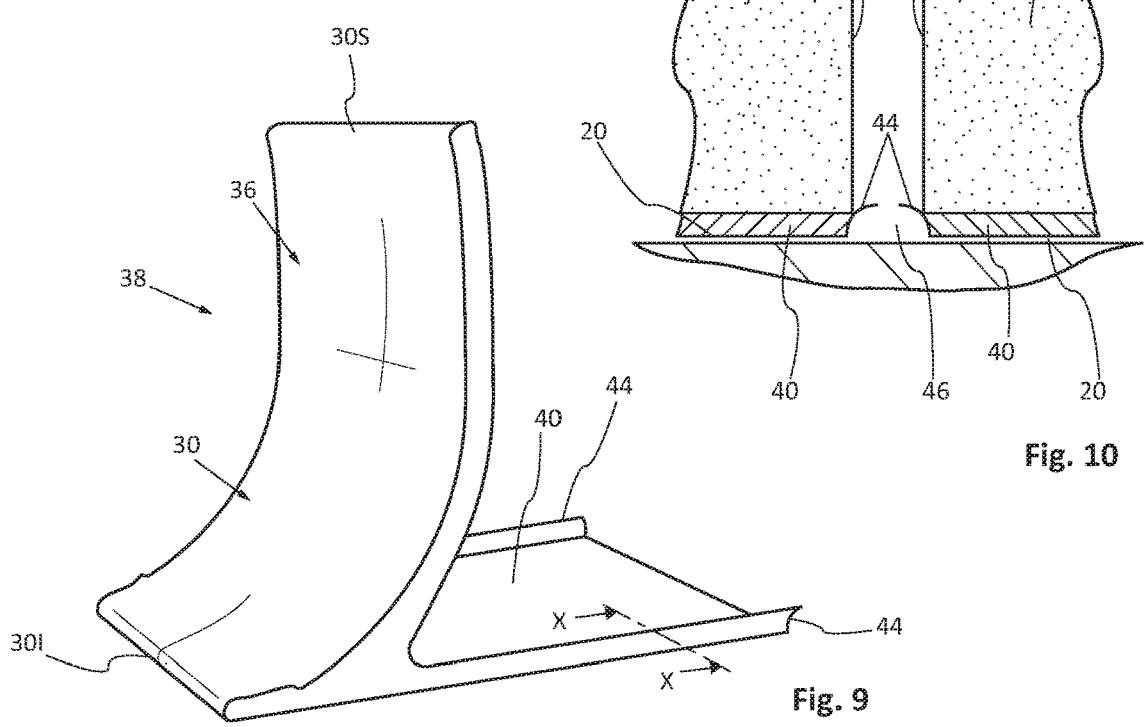
FIG. 9 is a perspective view of a deflector of the protective device seen in FIG. 8.

According to first embodiments seen in FIGS. 9 and 19, the protective device 18 is a plate 36 a front face 30 of which is curved, the plate 36 being separate from the ballast or being attached to a façade of a structure 10, as illustrated in FIGS. 19 and 23. According to the embodiment seen in FIGS. 19 and 23, the plate 36 can have a height on the order of 2 to 4 m or more. Nevertheless, the height of the plate 36 is not limited. This plate 36 can be attached by any appropriate connecting system to the structure, such as for example bolts. According to one configuration, the plate 36 is attached by connecting systems 37 provided near the lower edge 30I and by connecting systems 37' provided near the upper edge 30S.

According to another characteristic, the front face 30 comprises, on at least one part of its surface, a surface state structured so as to slow down the rise of the water and/or to accelerate its descent for example.

Figure 8:
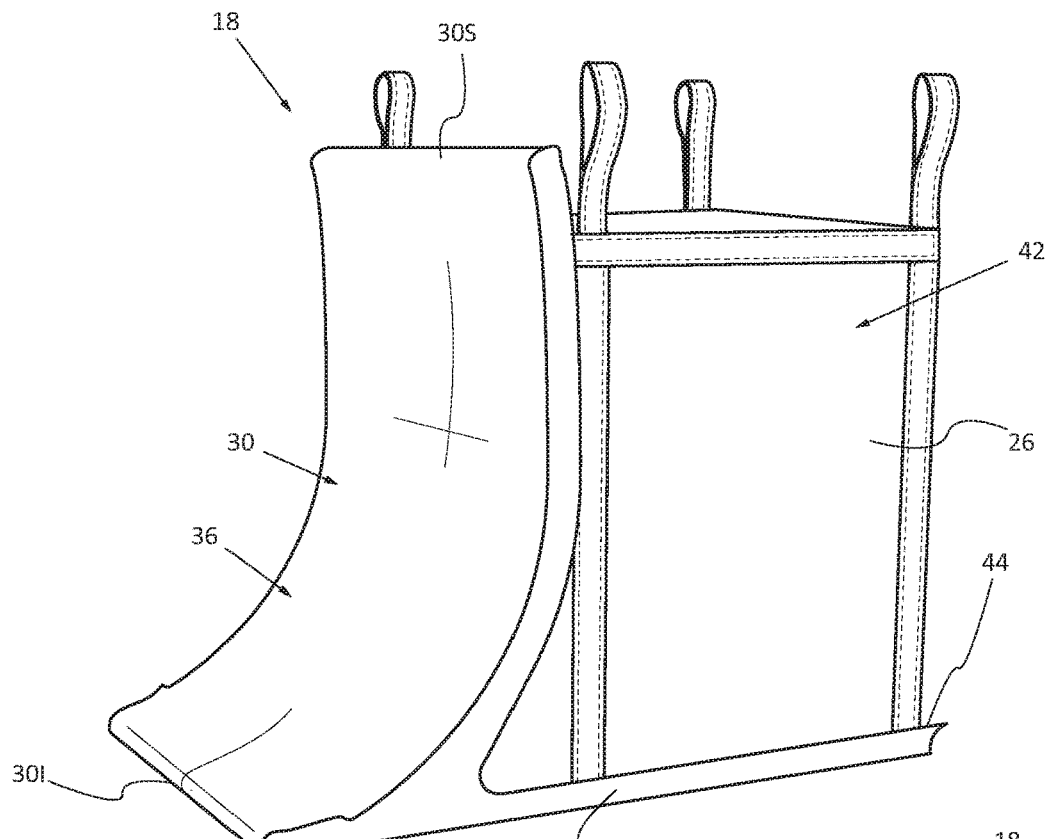
FIG. 8 is a perspective view of a protective device which illustrates a first embodiment of the invention.
Figure 10:
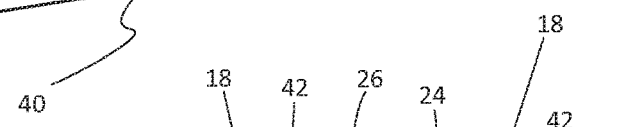
FIG. 10 is a cutaway view along the line X-X of FIG. 9.
Figure 22:
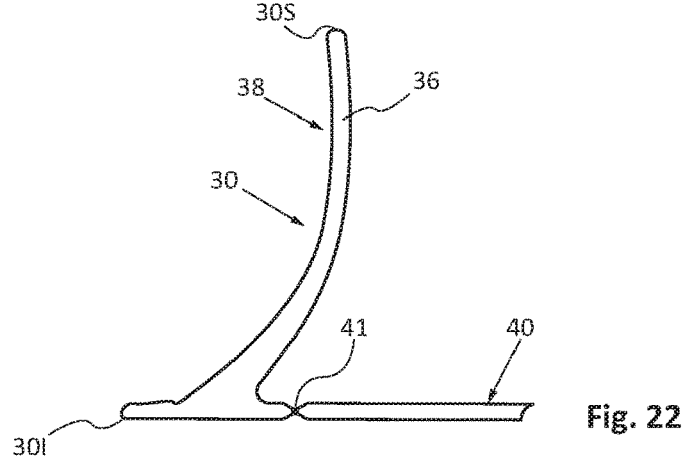
FIG. 22 is a side view of the protective device seen in FIG. 8 which illustrates a variant of the first embodiment.

According to the first embodiment seen in FIGS. 8 to 10, the protective device 18 comprises a deflector 38 which comprises a curved first plate 36, one face of which forms the curved front face 30, and a second plate 40 connected to the first plate 36, approximately horizontal, designed to rest on the ground. According to a first variant, the first and second plates 36 and 40 can be made in one piece and are rigid. According to another variant seen in FIG. 22, at least one part of the second plate 40 is made of a material that is more flexible than the first plate 36 to be able to adapt to possible unevenness of the ground. This second plate 40 is connected to the first plate 36 by a parallel joint 41 of the lower edge 30I that is positioned near said lower edge 30I. The first and second plates 36 and 40 as well as the joint 41 are made in one piece, the joint 41 being formed by a strip of flexible and deformable material.

This second plate 40 is dimensioned to receive a large capacity bag 42, the latter resting against the back face of the first plate 36. Advantageously, the large capacity bag 42 can be cube-shaped but can also be not cube-shaped but have shapes adapted to conform to the curved profile of the first plate 36.

Advantageously, the large capacity bag 42 is connected to the deflector 38. According to one embodiment, the first plate 36 comprises, in the area of its face opposite the front face 30, hooks that make it possible to connect the large capacity bag 42. However, the invention is not limited to this embodiment. Thus, other solutions can be envisaged to connect the large capacity bag 42 to the deflector 38. Preferably, the attachment systems connecting the large capacity bags to the deflectors 38 are positioned at the upper part of the deflector 38, near the upper edge 30S of the first plate 36.

Advantageously, each large capacity bag 42 comprises in the lower part an opening that can be closed by a tie. According to one configuration, each large capacity bag 42 appears in the form of a tube whose lower end is closed using a tie that encircles and tightens the flexible wall of the bag. Thus, at the start, the lower ends of the bags are closed and the bags are filled with sand. When the protective device is dismantled, each bag is lifted and the tie closing the lower part of the bag is removed so as to cause the emptying of the bag by gravity. According to one configuration, the tie appears in the form of a cable which has two ends that are inserted into a passage. Thus, the cable forms with the passage a loop which is tightened around the bag causing the passage to slide so as to reduce the size of the loop. To lock the passage relative to the cable, a wedge is inserted into the passage between the two strands of the cable passing through the passage. This wedge is located at one end of the passage opposite the one delimiting the loop of the cable which tightens the bag. To loosen the loop and open the bag, it is only necessary to remove the wedge. This action can be performed at a distance by connecting the wedge to a first end of a tie and by pulling at the other end of the tie.

The large capacity bag 42 is not further detailed because, except for the shape, it is substantially identical to the large capacity bags of the prior art called "big-bags" and comprises flexible walls (bottom and side walls) and straps in the upper part to be able to handle it.

Preferably, the second plate 40 comprises, in the area of the side edges oriented in the transverse direction, curved wings 44, approximately a quarter circle, the centers of which are offset outward relative to the side edges. These wings 44 can make it possible to wedge the large capacity bag 42 in the longitudinal direction. When two protective devices 18 are juxtaposed, as illustrated in FIG. 10, the juxtaposed wings 44 of the two protective devices 18 delimit with the ground a passage 46, with a section that is approximately half-disk shaped, to make it possible for the water to return sea side passing at the ground level via passage 46. According to a first variant seen in FIG. 9, the wings 44 extend over the entire length of the second plate 40. According to a second variant seen in FIG. 24, the wings 44 extend only over the front part (close to the lower edge 30I) of the second plate 40. This variant makes it possible to position the large capacity bags 42 straddling two second plates 40 of two juxtaposed protective devices.

According to another embodiment seen in FIG. 25, the lower face of the second plate 40 (the one oriented toward the ground) has at least one channel 47, preferably several channels 47, to make it possible for the water to return sea side passing between the ground and the second plate 40.

The deflector 38 can be made of plastic material or of composite material or of any other material. Preferably, the material of the deflector 38 is chosen so that it can be handled by one or two individuals. In a variant, the deflector 38 comprises at least one hook to be able to move it and put it in place with a hoisting device.

According to an operating method, the deflectors 38 are positioned next to one another so as to form a continuous line. Weighted large capacity bags 42, such as for example weighted with sand, are positioned on each of the deflectors 38. Of course, the invention is not limited to large capacity bags, the deflectors being able to be weighted by any other means.

Figure 11:
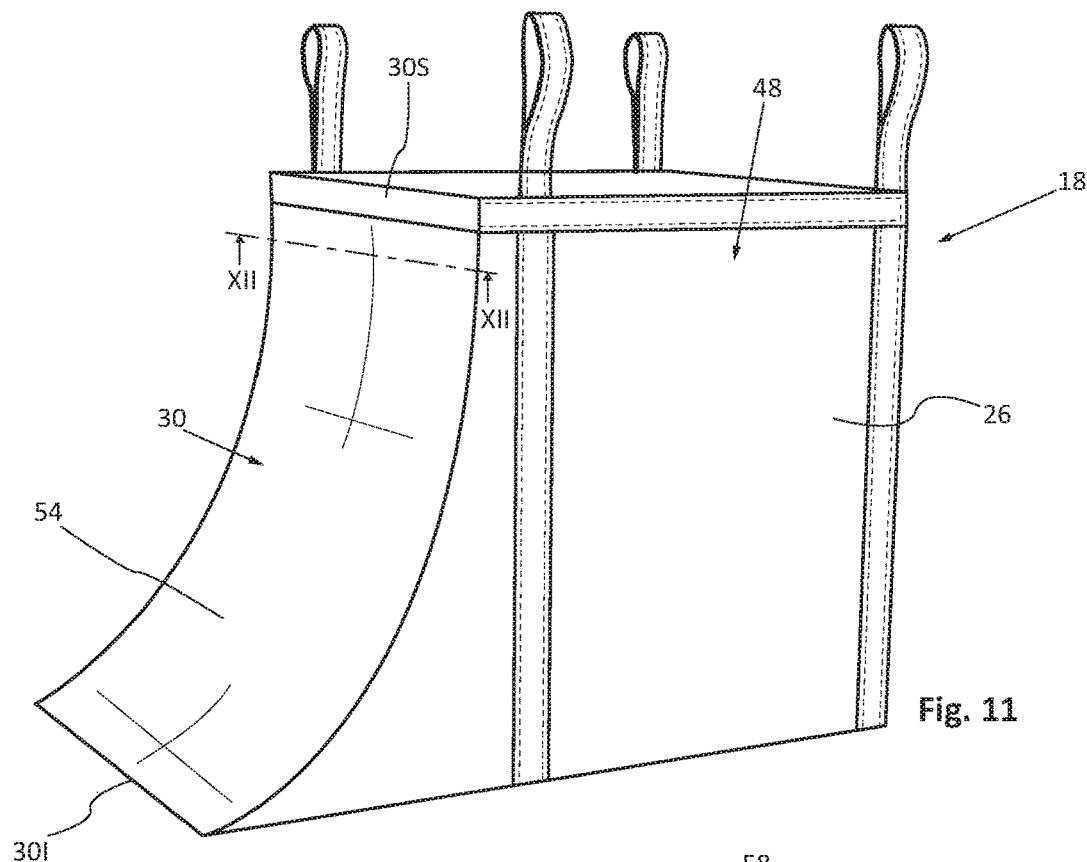
FIG. 11 is a perspective view of a protective device which illustrates a second embodiment of the invention.
Figure 12:
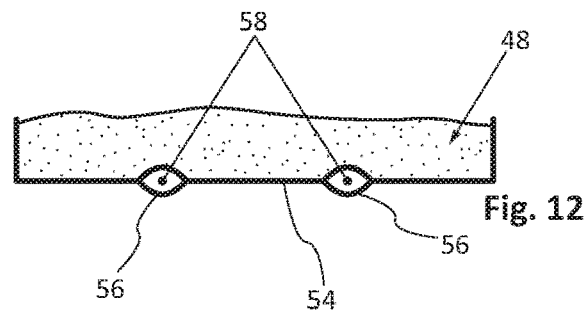
FIG. 12 is a cutaway view along the line XII-XII of FIG. 11.

According to a second embodiment seen in FIG. 11, the protective device 18 comprises a front face 30 which is integral with a large capacity bag 48 and which corresponds to one of the walls of the large capacity bag 48.

According to this second embodiment, the large capacity bag 48 comprises flexible walls, namely a bottom and side walls whose geometry is defined to form a curved front face 30.

According to this second embodiment, the side wall 54 of the large capacity bag 48, which forms the front face 30, comprises at least one sleeve 56 located in a plane perpendicular to the lower 30I and upper 30S edges and which extends between the lower and upper edges 30I and 30S. Generally, the large capacity bag 48 comprises several sleeves 56 that are parallel to one another and distributed along the lower and upper edges 30I and 30S. To stiffen the front face 30, the large capacity bag 48 comprises, for each sleeve 56, a stiffener 58 inserted in the sleeve 56, the stiffener 58 being a stiff elongated element whose profile is adapted as a function of the desired curvature for the front face 30.

In this case, prior to the filling of the large capacity bags, the stiffeners 58 are placed in the sleeves. Once filled, the large capacity bags 48 are aligned so as to form the protective dike.

Figure 20:
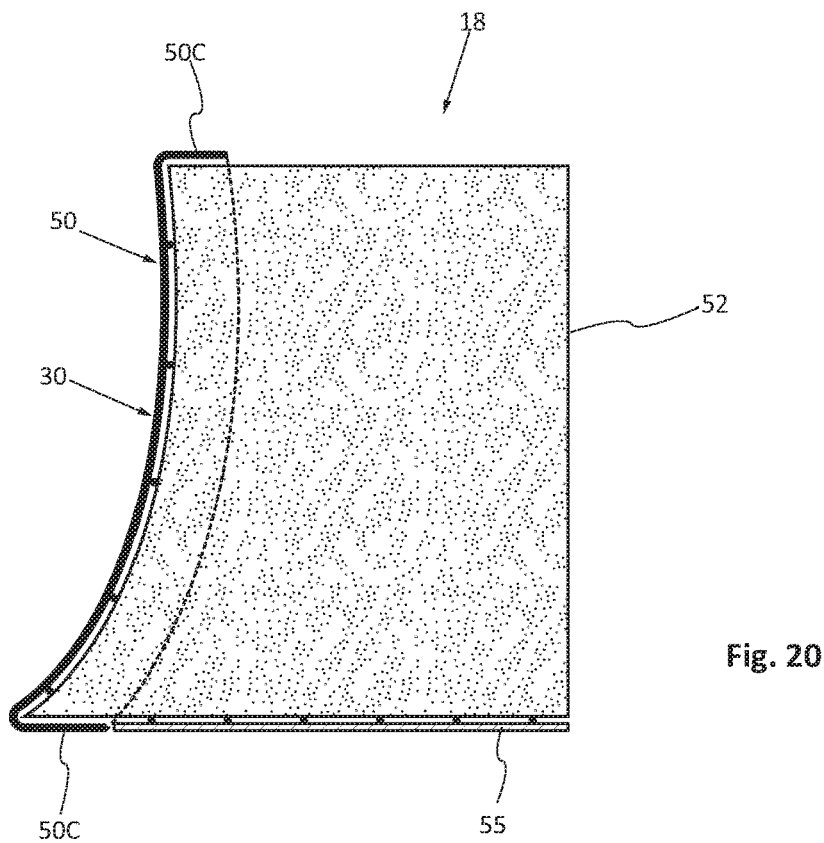
FIG. 20 is a cross section of the device seen in FIG. 16 in the deployed state.
Figure 21:
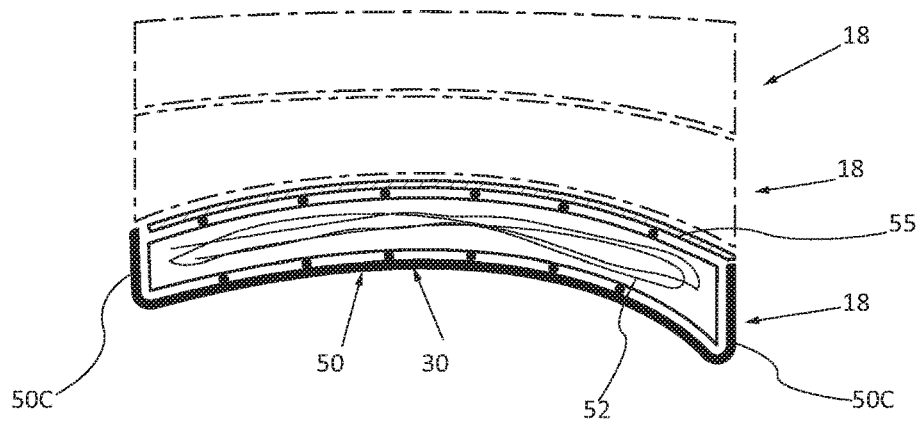
FIG. 21 is a cutaway view of the device seen in FIG. 16 in the folded state.

According to the third embodiment illustrated in FIGS. 16, 20 and 21, the protective device 18 comprises a rigid shell 50 which forms the front face 30 and which is integral with large capacity bag 52. The rigid shell 50 is made of composite material. It can be obtained by molding for example. This rigid shell 50 comprises a base which forms the front face 30 and peripheral walls 50C positioned on the four edges of the front face 30 and which form a peripheral belt. The base and the peripheral belt of the rigid shell 50 form a receptacle into which the large capacity bag 52 can be folded when it is empty.

According to the third embodiment, the protective device 18 is designed to support a deployed state when the large capacity bag 52 is filled and weighted, as illustrated in FIG. 20, or a folded state when the large capacity bag 52 is empty as illustrated in FIG. 21. In the folded state, several protective devices 18 can be stacked on top of each other as illustrated in FIG. 21.

The large capacity bag 52 and the rigid shell 50 are connected by any appropriate means, such as by welding for example.

To strengthen its adherence with the ground, the protective device 18 comprises a baseplate 55 interposed between the large capacity bag 52 and the ground. This baseplate 55 can be connected to the large capacity bag 52 or to the rigid shell 50 by any appropriate means. This baseplate 55 can be provided on all the embodiments having a large capacity bag. This baseplate 55 is made of a flexible material to be able to adapt to possible unevenness of the ground.

In the case of the third embodiment, the baseplate 55 is positioned and dimensioned so as to close up, in the folded state, the receptacle formed by the base and the peripheral belt of the rigid shell 50, as illustrated in FIG. 21.

The large capacity bags 48, 52 are weighted, for example with sand, then aligned so as to form a protective dike.

Figures 6, 7:
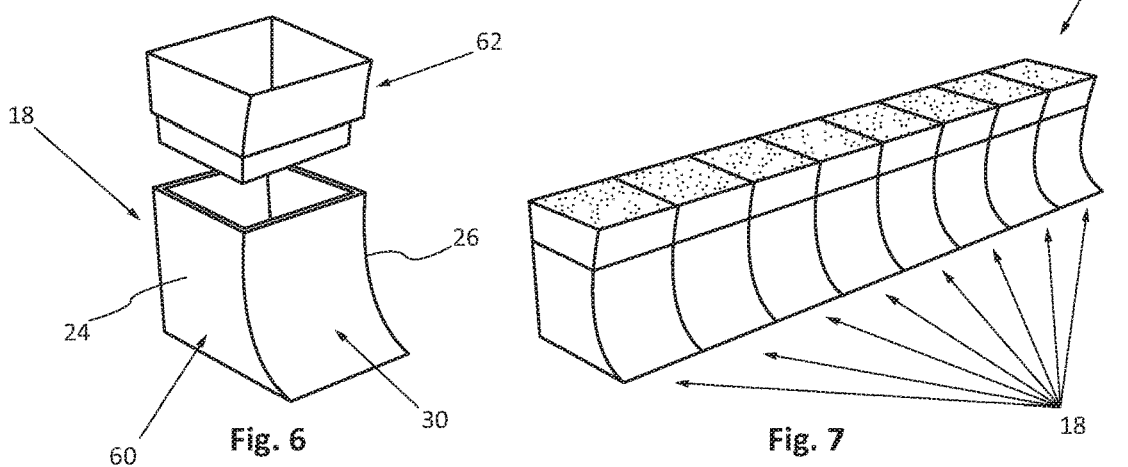
FIG. 6 is a perspective view of a protective device equipped with an extension which illustrates an embodiment of the invention.
FIG. 7 is a perspective view of a protective dike made of several aligned protective devices.

According to another embodiment seen in FIG. 6, the protective device 18 is a rigid container 60 which comprises a base and side walls which delimit an upper opening to weight it, one of the side walls of the rigid container 60 being designed to form the curved front face 30.

According to this embodiment, the protective device is made of a material making it possible for one or two individuals to handle it when it is empty. In a variant, each rigid container 60 can comprise at least one hanging point to be able to be lifted and positioned using a hoisting device.

For its implementation, several empty rigid containers 60 are aligned to form a protective dike 14, as illustrated in FIG. 7, then they are filled with a ballast, such as for example sand.

According to this embodiment, each rigid container 60 can comprise an extension 62 to increase the mass of the ballast. This extension 62 comprises side walls which form a belt and which are designed to be fitted into the upper opening of the rigid container 60.

In the case of the first and second embodiments, the mass of the ballast can be increased by adding at least one filled large capacity bag 64 for each protective device 14, the large capacity bags being either stacked or placed behind one another, as illustrated in FIG. 19.

The lower part of the protective device, namely the second plate 40, the bottom of the large capacity bag 48, 52 or of the rigid container 60 is not necessarily flat, as illustrated in FIG. 17. Thus, the lower part of the protective device 18 has shapes adapted to the ground on which they rest. By way of example, the ground can have a low wall 66 as illustrated in FIG. 18. In this case, the lower part of each protective device comprises a recess 68 designed to conform to the shape of the low wall 66.

According to another characteristic, each protective device comprises a cover 70 to close up the upper opening of the large capacity bag or of the rigid container. The ultimate purpose of this cover is to prevent water from penetrating into the large capacity bag or the rigid container. According to one embodiment, the cover 70 comprises an edge 72 to be attached to the bag or rigid container. The cover 70 can be attached to the bag or to the rigid container by any other means. In addition, the container can comprise a drainage system in the area of the base to remove water.

According to another characteristic of the invention, each protective device comprises at least one system for connecting with another protective device. This characteristic makes it possible to prevent the appearance of gaps in the protective dike.

According to an embodiment suitable for the large capacity bag, each connecting system comprises a strap 74 that is integral with the protective device, more particularly with the back face of the large capacity bag, which has at a first end an extension 76, which extends beyond the side face of the bag, and at a second end at least one loop 78 (or any other attachment system) to make it possible to connect the extension 76 of a strap that is integral with an adjacent protective device.

Figure 14:
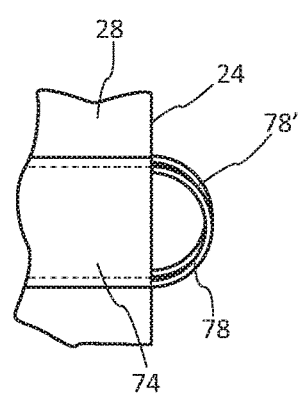
FIG. 14 is a detail of FIG. 13.

According to a configuration seen in FIG. 14, the second end of the strap 74 comprises two loops 78, 78' (or any other system of attachment).

Figure 13:
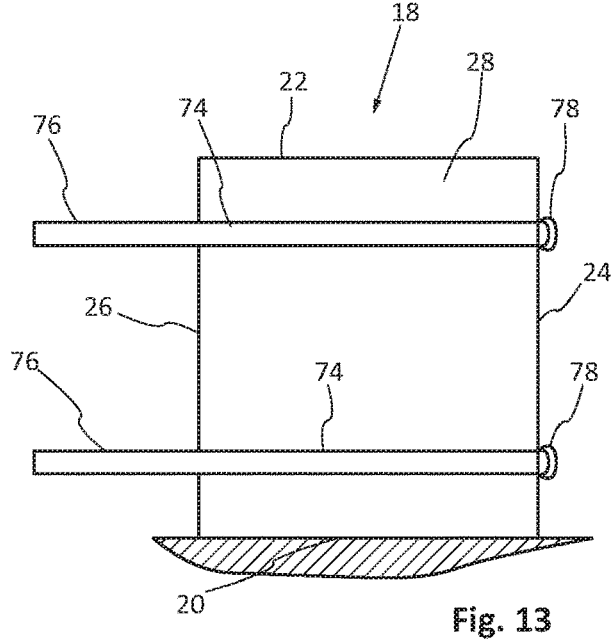
FIG. 13 is a rear view of a protective device.

As illustrated in FIG. 13, each protective device comprises two approximately horizontal straps 74, a first strap positioned near the top of the bag and a second strap positioned near the bottom of the bag. In the case of a large capacity bag, each strap is sewn onto the back face of the large capacity bag.

When the protective devices are aligned, the extension 76 of each strap 74 is attached to the loops 78 of the adjacent protective device. This solution makes it possible, simply and effectively, to connect the protective devices to one another.

In FIGS. 26A and 26B, another embodiment of a connecting system has been represented.

Each bag comprises in the area of a first side a first strap 90 which forms a loop 92 and in the area of a second side a second strap 94 which connects a clasp 96 to the bag. According to one embodiment, the clasp 96 appears in the form of a plate 98 which has a first end 98.1 connected to the second strap 94, a second end 98.2 which forms a handle and an intermediate part 98.3 which has a hole 100. The intermediate part 98.3 can have a height less than that of the ends 98.1 and 98.2.

When the loop 92 is not inserted into the hole 100, the connecting system is in the detached state, as illustrated in FIG. 26A. To connect first and second protection devices, the loop 92 connected to the first protection device is inserted into the hole 100 of the clasp 96 connected to the second protective device, then the second end 98.2 of the plate 98 is inserted into the loop 92 having passed through the hole 100. Thus, the connecting system is in the attached state, as illustrated in FIG. 26B. To detach the two protective devices, it is necessary to rotate the plate 98 (by using the handle of the second end 98.2) around the first end 98.1 so as to bring the second end 98.2 of the second protective device closer. This operation makes it possible to slacken the straps 90, 94 to withdraw the loop 92 from the hole 100.

Other connecting systems can be envisaged to connect two protective devices, such as for example a first cable connected to a first protective device, a second cable connected to a second protective device, a passage and a wedge similar to those used to close the lower end of the bag.

To form a protective dike, several protection devices are aligned and positioned so as to obtain a continuity of their front faces 30. They are weighted as a function of needs. Thus, a first line 80 of protective devices 18 can be reinforced by a line 82 of simple large capacity bags 64, without a curved face, to increase the mass of the ballast.

In addition, a second line 84 of protective devices 18, in the form of curved plates, can be positioned behind the first line 80 of protective devices to reinforce the protection of a structure.

Thus, a protective dike can comprise several lines of protective devices which can be different from one line to the other.

The number of protective devices is determined as a function of the length desired for the protective dike. At least some of the protective devices 18 comprise at least one weighted container positioned behind the curved front face 30.

The protective devices according to the invention can be positioned quickly between two tides. At the end of an alert, they can be quickly removed.

They are reusable and can be stored in a confined space when each device comprises a large capacity bag with a flexible wall to weight it.

The invention claimed is:

1. A plurality of protective devices (18) designed to be aligned so as to form a protective dike, each protective device (18) comprising:
   a bag (52) comprising a base, a front face, a rear face, and side walls which delimit an upper opening, wherein the base, the front face, the rear face, and the side walls define an interior volume of the bag (52), the bag being configured to define a weighted container by providing ballast, via the upper opening, to the interior volume of the bag;
   a rigid shell (50) with a curved front face (30), the rigid shell (50) being attached to the front face of the bag (52), the bag (50) being positioned behind the curved front face (30) of the rigid shell (50);
   a front surface of the curved front face (30) of the rigid shell (50) being configured to divert water of a wave upward then drive the water of the wave back in a direction of an outflow of the wave;
   wherein the front face (30) of the rigid shell (50) comprises lower and upper edges (30I, 30S) and wherein each curved lines (32) extend between the lower and upper edges (30I, 30S) of the front face (30) of the rigid shell (50),
   wherein each curved line (32) comprises a first sector (32.1) which forms a first arc and which extends from a first point (A0) located on the lower edge (30I) of the front face (30) to a second point (A1), the first sector further comprising a third point (A2) intermediate the first point (A0) and the second point (A1),
   wherein each curved line (32) comprises at least a second sector (32.2) which extends up to a fourth point (A3) located on the upper edge (30S) of the front face (30),
   wherein the second sector (32.2) is a second arc,
   wherein a line passing through the second and fourth points (A1, A3) forms an angle greater than 1° with the vertical, and
   wherein the fourth point (A3) is offset toward the first point (A0) relative to the vertical passing through the second point (A1); and
   at least one system for connecting the bag (52) with another bag (52) of another protective device,
   the plurality of protective devices comprising at least a first protective device and a second protective device,
   wherein the at least one system for connecting the bag (52) with another bag (52) of another protective device of each first and second protective device comprises a strap (74) that is integral with the first or second protective device, and which strap has, at a first end, an extension (76) which extends beyond the side face of the bag and, at a second end, at least an attachment system, the extension of the strap of the first protective device being operative to connect to the at least attachment system of the strap of the second protective device.

2. The plurality of protective devices according to claim 1, wherein the front face, the rear face, and the side walls of the bag (50) are flexible.

3. The plurality of protective devices according to claim 1, wherein the front face of the bag (50) is shaped to conform to the curved front face (30) of the rigid shell (50).

4. The plurality of protective devices according to claim 3, wherein the rigid shell (50) further comprises peripheral walls (50C) located on four perimeter edges of the front face (30) of the bag (50), the peripheral walls (50*c*) forming a peripheral belt that extends around a perimeter of the front face and covers a front portion of the base and a front portion of the side walls of the bag (52).

5. The plurality of protective devices according to claim 4, wherein the front face, the rear face, and the side walls of the bag (50) are flexible.

6. The plurality of protective devices according to claim 1, wherein the front face of the bag (52) is a curved front face of the bag (52), a rear surface of the curved front face (30) of the rigid shell (50) being located adjacent the curved front face of the bag (52).

7. The plurality of protective devices according to claim 1, wherein the first sector (32.1) extends from the first point (A0) to the second point (A1) such that a ratio 2×L1/3×L2 is equal to a constant, L2 being the total height of the front face (30), L1 corresponding to the distance between the first point (A0) and the center (O1) of the first arc.

8. The plurality of protective devices according to claim 1, wherein the third point (A2) of the first section (32.1) is located at about a third of a height L2 of the front face (30), such that the horizontal direction and a line passing through the first and third points (A0A2) form an angle of about 35°.

9. The plurality of protective devices according to claim 1,
wherein the second point (A1) is a junction point, and
wherein the curved line (32) comprises an intermediate sector (32.3) which ensures continuity between the first and second sectors (32.1, 32.2),
the first sector (32.1) and the intermediate sector (32.3) having approximately a same first tangent at the junction point (A1) to ensure a continuity between the first and intermediate sectors (32.1 and 32.3),
the intermediate sector (32.3) and the second sector (32.2) having approximately a same second tangent at the junction point (A4) to ensure a continuity between the intermediate and second sectors (32.3, 32.2).

10. A protective dike comprising the plurality of protective devices according to claim 1,
wherein the plurality of protective devices are aligned and positioned so as to obtain a continuity of the front faces (30) of the plural protective devices,
wherein the bag (52) and the another bag (52) of another protective device of each first and second protective device are connected to each other with the extension of the strap of the first protective device being connected to the at least an attachment system of the strap of the second protective device, and
wherein each bag is the weighted container with the interior volume of each bag containing the ballast, the upper opening of each bag allowing the ballast to be added and removed from the interior volume of each bag.

11. The plurality of protective devices according to claim 1, wherein the line passing through the second and fourth points (A1A3) forms an angle about 5° with the vertical.

12. The plurality of protective devices according to claim 1, wherein,
the front face, the rear face, and the side walls of the bag (50) are flexible,
wherein the front face of the bag (50) is shaped to conform to the curved front face (30) of the rigid shell (50), and
the rigid shell (50) further comprises peripheral walls (50C) located on four perimeter edges of the front face (30) of the bag (50), the peripheral walls (50*c*) forming a peripheral belt that extends around a perimeter of the front face and covers a front portion of the base and a front portion of the side walls of the bag (52).

13. A protective device (18) designed to be aligned with other protective devices so as to form a protective dike, the protective device (18) comprising:
a curved front face (30) designed to divert water of a wave upward then drive the water of the wave back in a direction of an outflow of the wave;
a weighted container positioned behind the curved front face (30), the weighted container comprising bag (48) with side walls,
wherein one of the side walls forms the curved front face (30) and comprises at least one sleeve (56) located in a plane perpendicular to lower (30I) and upper (30S) edges of the front face (30) and extends between the lower and upper edges (30I) and (30S) of the front face (30); and
for each sleeve (56), a stiffener (58) inserted in the sleeve (56), the stiffener (58) being a stiff elongated element whose profile is adapted as a function of a desired curvature for the front face (30).

\* \* \* \* \*